G. R. SHULTZ.
THRESHING CYLINDER AND CONCAVE.
APPLICATION FILED SEPT. 25, 1913.
1,092,757.
Patented Apr. 7, 1914.
4 SHEETS—SHEET 1.
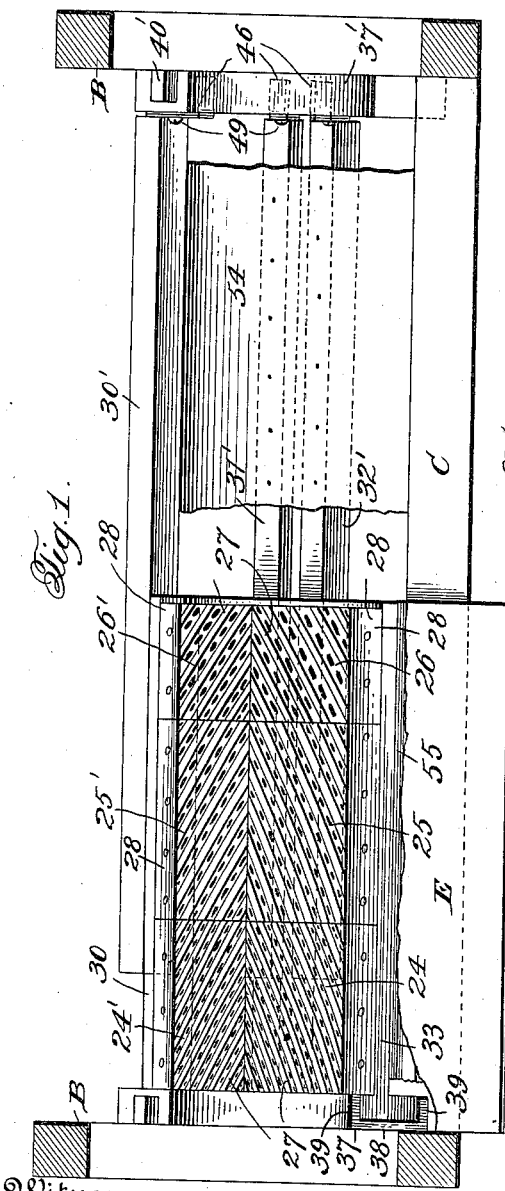
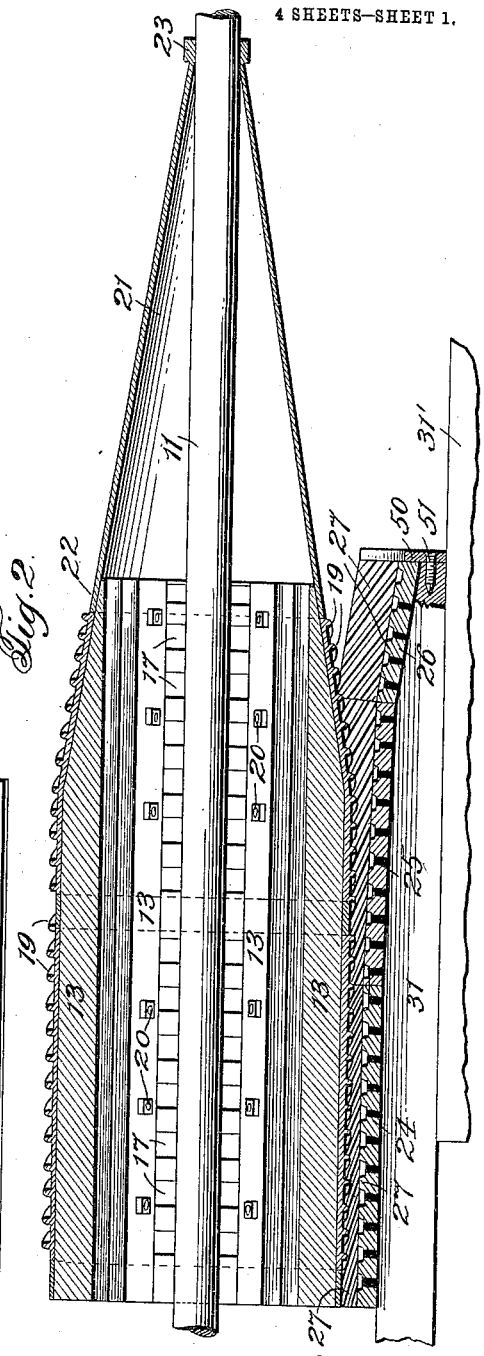
Witnesses:
Jas E Hutchinson
H. N. Ramsey
Inventor:
Guy R. Shultz,
By Royal E Burnham, Attorney G. R. SHULTZ.
THRESHING CYLINDER AND CONCAVE.
APPLICATION FILED SEPT. 25, 1913.
1,092,757.
Patented Apr. 7, 1914.
4 SHEETS—SHEET 2.
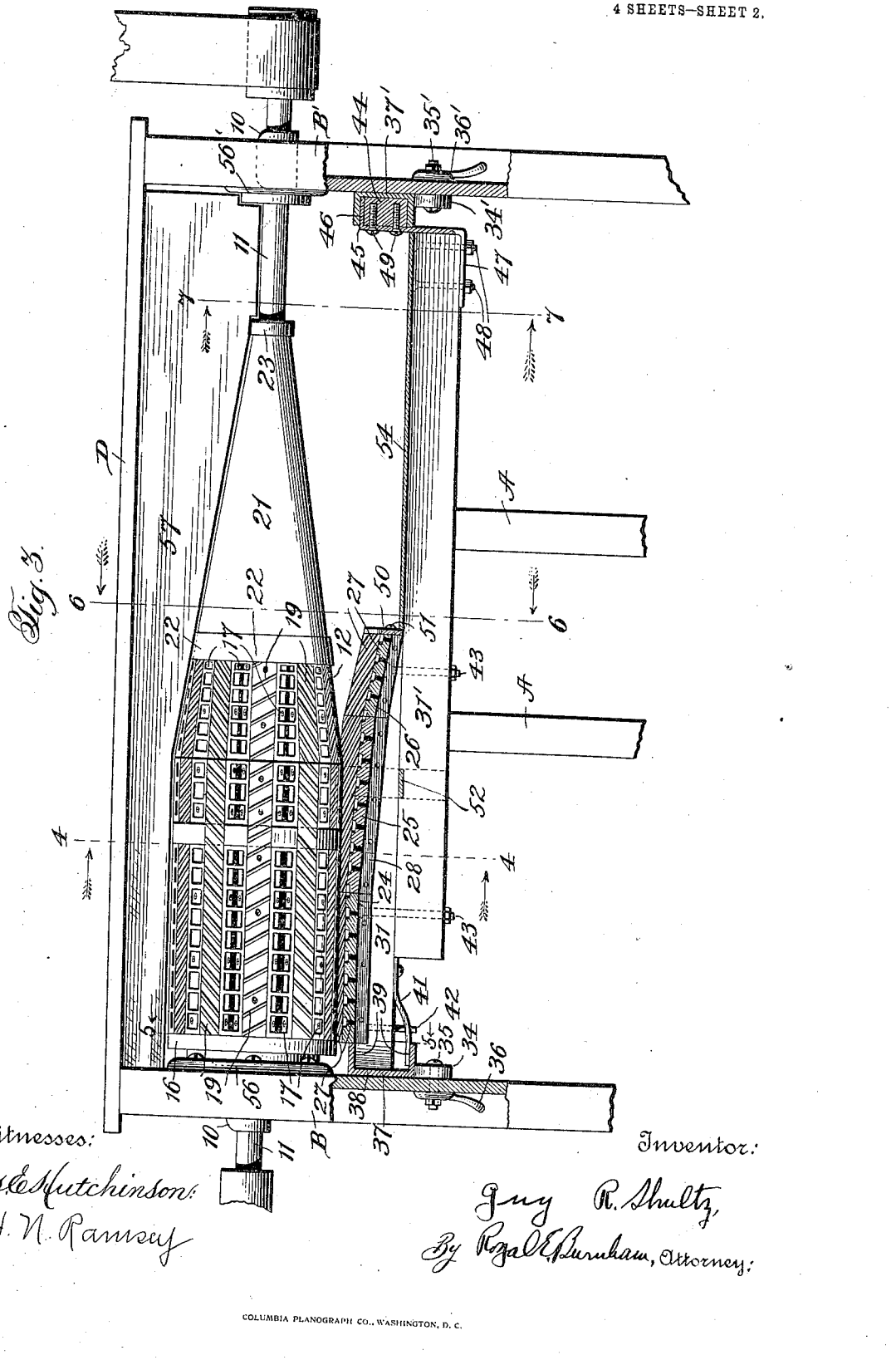

G. R. SHULTZ.
THRESHING CYLINDER AND CONCAVE.
APPLICATION FILED SEPT. 25, 1913.
1,092,757.
Patented Apr. 7, 1914.
4 SHEETS—SHEET 3.
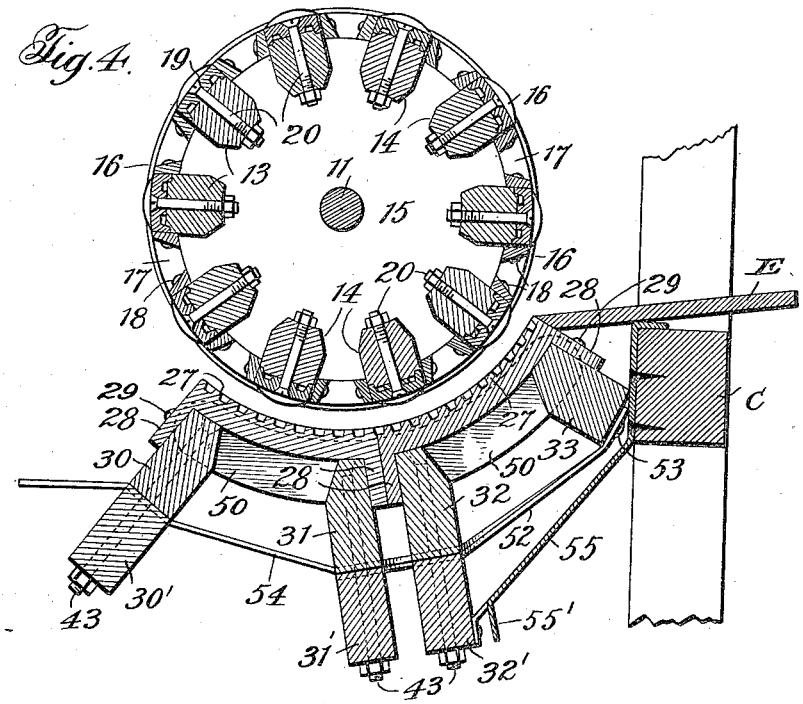
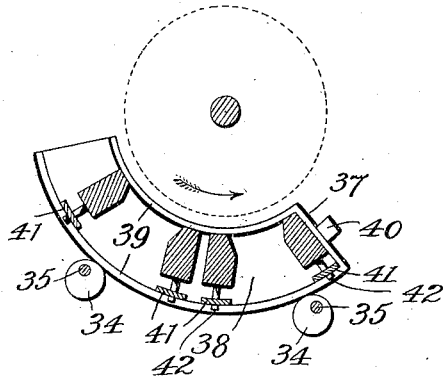
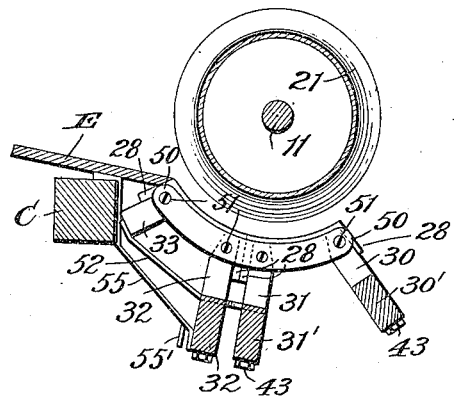
Witnesses:
Jas. E. Hutchinson
H. N. Ramsey
Inventor:
Guy R. Shultz
By Ryal E. Burnham, Attorney.

G. R. SHULTZ.
THRESHING CYLINDER AND CONCAVE.
APPLICATION FILED SEPT. 25, 1913.
1,092,757.
Patented Apr. 7, 1914.
4 SHEETS—SHEET 4.
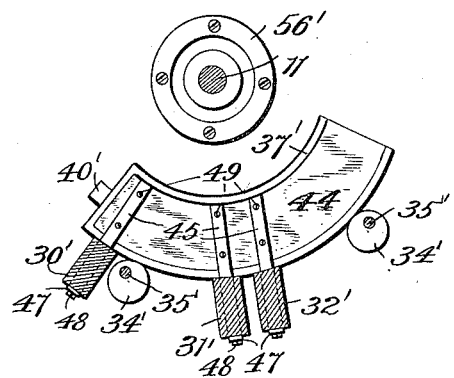
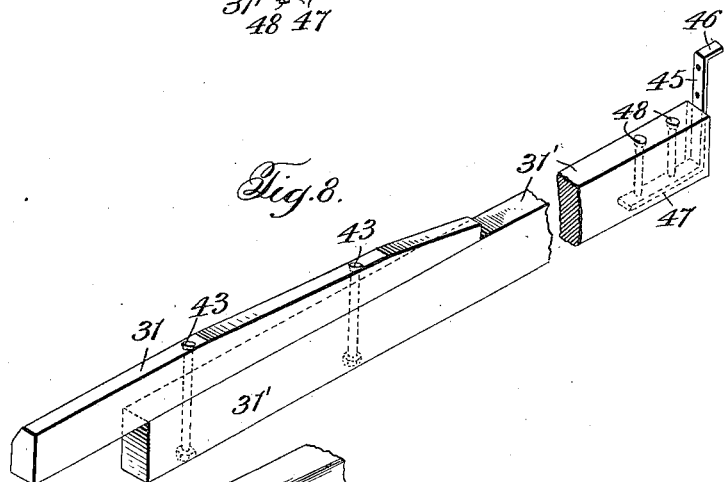
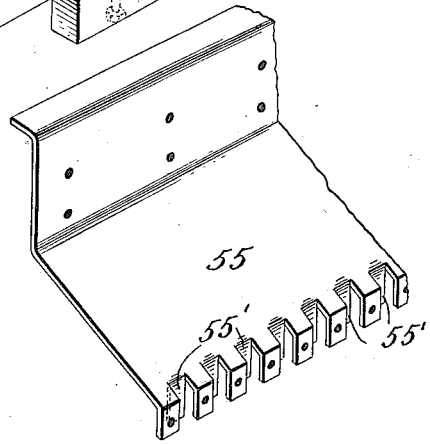
Witnesses:
Jas E Hutchinson
H. N. Ramsey
Inventor:
Guy R. Shultz,
By Royal E Burnham, Attorney

UNITED STATES PATENT OFFICE.

GUY REYNOLDS SHULTZ, OF DOUGLAS COUNTY, KANSAS.

THRESHING CYLINDER AND CONCAVE.

1,092,757.  Specification of Letters Patent.  Patented Apr. 7, 1914.

Application filed September 25, 1913. Serial No. 791,825.

*To all whom it may concern:*

Be it known that I, GUY R. SHULTZ, a citizen of the United States, residing in Douglas county, in the State of Kansas, have invented certain new and useful Improvements in Threshing Cylinders and Concaves, of which the following is a specification, reference being had therein to the accompanying drawings.

This invention has as an object the provision of a threshing cylinder and concave so shaped that sheaves of grain or seed bearing straw or stalks may be passed between them and the grain threshed out without undue injury to the straw or stalks, breaking up of the sheaves, or removal of the binding, whereby rebinding of the straw or stalks when it is desired for particular purposes is obviated; and the cylinder and concave are adapted particularly for threshing rye and other grain, and broom-corn and the like, in such manner that the straw or stalks after threshing will be available for use as filling for horse-collars and otherwise where unbroken straws or stalks are required.

The invention also relates to certain details of construction, whereby machines of this kind are made stronger and more efficient.

When read in connection with the description herein, the details of construction and arrangement of parts contemplated by the invention will be apparent from the accompanying drawings, wherein an embodiment of the invention is disclosed for purposes of illustration.

While the form of the invention shown in the drawings now is preferred, it is to be understood that it is not the intention to be limited necessarily to the precise delineation herein in interpretation of claims hereinafter, as it is obvious that modifications can be made therein within the limits of the claims without departing from the nature and spirit of the invention.

Like reference-characters refer to corresponding parts in the views of the drawings, of which—

Figure 1 is a plan view, the cylinder being omitted; Fig. 2 is a vertical longitudinal sectional view; Fig. 3 is a view in elevation of the intake or front end of the machine, parts being shown in section; Fig. 4 is an enlarged cross-section on the line 4—4, Fig. 3; Fig. 5 is a cross-section on the line 5—5, Fig. 3, the concave being removed and the cylinder shown in dotted lines; Fig. 6 is a cross-section on the line 6—6, Fig. 3; Fig. 7 is a cross-section on the line 7—7, Fig. 3; Fig. 8 is a perspective view of the spliced bars; and Fig. 9 is a detail view showing arrangement of grain-pans.

Having more particular reference to the drawings, A designates uprights, B, B' side, and C a cross frame member of a threshing-machine. Journal-boxes 10 are positioned in the side frame members, and in them is journaled a shaft 11, having thereon a threshing-cylinder 12. In one portion, say for something over one-half its length from one end, the cylinder is formed with longitudinal bars 13, preferably of wood, and held in place by having their ends disposed in slots 14 of disk-like heads 15 fast on the shaft. The bars are held in the slots by a band 16. Set between the bars are spacing members 17, which are in the form of open frames, and they have their ends beveled to conform to the converging sides of the bars, against which they abut and to which they are secured by screws or other suitable fasteners 18. Rubbing-plates 19 are secured to the outer sides of the bars by bolts 20 passing through the bars and having countersunk heads set in the plates. The plates are disposed in abutting succession on the bars, from side to side of which they extend in oblique arrangement, and their outer sides are rounded. The rubbing-plates are set on successive bars around the cylinder at different angles of obliquity, that is the plates of one bar slant in one direction and those of the next adjacent bars slant in an opposite direction.

At a place about two-thirds the distance from their outer ends the bars are tapered, so that the cylinder gradually decreases in size toward the other end, and this taper or reduction in size of the cylinder is continued in a smooth sheet-metal cone portion 21, the larger end of which is formed with an axially-extending flange 22, which embraces the inner ends of the bars and holds them in place, and the smaller end of the cone portion is secured to shaft 11 by a hub 23. Thus it will be seen that the cylinder is of uniform diameter in one portion and gradually decreases in size from a place intermediate its ends toward one end, and that for the greater or a considerable portion of the taper the cylinder is smooth and devoid of rubbing-plates or the like.

For coöperation with the cylinder in the threshing of grain or the like, there is placed under the portion of the cylinder that is provided with rubbing-plates a concave that includes segmental plates disposed longitudinally in series 24, 25, and 26, and in series 24', 25', and 26' laterally abutting the first series. The concave plates are formed on their upper sides with obliquely-disposed rubbing-ribs 27, and the ribs of one series of plates are slanted in one direction and those of the other series in a different direction. As clearly seen in Fig. 4, the plates are formed with depending side flanges 28, and the plates rest on, and their flanges abut and are secured by screws 29 to the sides of, bars 30, 31, 32, and 33. The surfaces of the bars upon which the plates 24 and 24' rest are substantially parallel to the axis of the cylinder, so that those plates, which coöperate with the outer end portion of the rubbing part of the cylinder, are supported in substantially parallel relation thereto; the surfaces of the bars upon which the plates 25 and 25' next in series rest diverge slightly from the axis of the cylinder, so that those plates are supported in similar divergent relation to the intermediate portion of the rubbing part of the cylinder; and the surfaces of the bars upon which rest the plates 26 and 26', which are last in the series from the outer end and which coöperate with the tapered portion of the rubbing part of the cylinder, diverge to a greater degree from the axis of the cylinder, so that those plates are supported in similar divergent relation to the rubbing part of the cylinder. This divergent disposition of the plates 25, 25', 26, and 26' may be effected by reducing the thickness of the bars on their sides upon which the plates rest; and the result is that there is more space between the inner rubbing part of the cylinder and the concave than between the portions at and adjacent to the end of the concave.

For the purpose of supporting the concave bars 30, 31, 32, and 33 at the rubbing side of the machine, eccentrics or cams 34, constituting supporting projections, are clamped to the inner side of the frame by bolts 35, which pass through a frame member and have manually-operable nuts 36 thereon outside of the frame member. These cams support a segmental supporting member 37 in a position substantially concentric with the axis of the cylinder. The member 37 comprises a flat web 38, which abuts the inner side of the frame, and a flange 39 outstanding from the upper and lower edges and from the rear end, the member thus having trough-like form and being open at the front end. The rear or flanged end of the member contacts with a lug 40 on the frame. The ends of the concave bars are disposed between the flanges and they abut the web of the supporting member 37, whereby that member is held against the inner side of the frame and in supported relation to the cams. The concave bars have secured to their under sides, or to the sides opposite to those upon which the concave plates rest, leaf-springs 41, the free ends of which rest on the lower flange of the supporting member and keep the bars pressed normally against the upper flange. The springs afford a resilient support for the concave at one end and permit the concave to give under pressure of material between it and the cylinder. Pins 42 attached to the bars and extending through the springs intermediate their ends act as guides for the springs.

In order to support the bars 30, 31, and 32 at their inner ends, there are spliced thereto by bolts 43 bars 30', 31', and 32', which extend toward the other side of the machine, where there are cams 34' held in relatively the same positions as, and by means 35' and 36' similar to, cams 34. A supporting member 37', of a formation similar to member 37, and having therein a block of wood or similar material 44, rests on cams 34' with its rear end normally in contact with a lug 40' on the frame. A hanger 45, having an upper lip 46 extending into the member 37' and over the block 44 and an oppositely-disposed lower lip 47 arranged to have a bar seated thereon, is secured to each of bars 30', 31', and 32' by bolts 48 and to the block 44 of the supporting member by screws 49. The bars are of the proper length to hold the supporting member 37' when attached thereto as described against the inner side of the frame and in supported relation to the cams 34'.

Owing to the fact that the concave bar 33 is positioned close to the front frame member C of the machine and almost abuts that member, there is not sufficient space for accommodation of a bar such as spliced to the other concave bars. Therefore, in order to support the inner end of bar 33 and also to afford spacing means for the bars in addition to that afforded by the concave plates, a segmental strap 50 is secured to the inner ends of all four bars by fastenings 51, and a strap 52 is secured to the under side of bar 33 and between bars 32 and 32' and bars 31 and 31' by the splice-bolts 43 and fastenings 53.

Underneath the cone portion of the cylinder and the exposed part of the shaft, the concave is formed of a sheet-metal trough 54 secured to the tops of the bars 30', 31', and 32' and to the front frame member, and from which the butt ends of sheaves passing through the machine work during action of the cylinder, the sheaves at the same time taking rearwardly any threshed grain that may have worked to that portion of the concave. In order to catch any grain that may work under the concave plates and to direct it from the front of the machine, underneath those plates a sheet-metal member 55 is secured along its front edge to the front frame member and along its rear or opposite edge to the spliced bar 32'. The edge of the member 55 that is attached to bar 32' is slitted, whereby fingers 55' are formed, and alternate fingers are secured to the bar and alternate fingers bent downwardly, so that grain may drop through to other means of grain disposal in the machine.

For the purpose of preventing material operated on by the machine from working into the shaft-bearings, I provide a shield 56 attached to the side of the frame on the rubbing side and extending to the end of the cylinder, and at the other side the shaft is surrounded by a somewhat similar shield 56'.

A shield 57, made of a piece of comparatively heavy flexible material, such as belting fabric, cut in its lower portion to conform approximately to the shape of the cylinder, is attached at its upper edge to the top D of the machine from which it hangs, and this shield operates to retard return movement of material that may have a tendency to make a complete cycle of rotation with the cylinder.

When the machine is in operation, sheaves in bound condition are placed on a grain-receiving board E and shoved therefrom between the cylinder and concave, with their smaller and grain-bearing ends in position to be acted upon by the concave plates and the rubbing portion of the cylinder and with their larger butt ends accommodated in the larger space underneath the cone portion of the cylinder. The lugs 40 and 40' prevent the concave from being moved rearwardly under the influence of the rotation of the cylinder. The springs 41 permit the concave to give when comparatively large sheaves are put through, and they also operate to maintain a substantially uniform pressure on the sheaves between the cylinder and concave. By turning the cams 34 and 34' the spring pressure may be increased or decreased in an obvious manner. It will be seen that the formation of the cylinder and concave is such that it is unnecessary to cut the bands of the sheaves, and that, in view of the fact that the sheaves go through in bound condition, the straw thereof is not broken up and rendered unfit for some uses, as is the case when the bands are cut. This enables the threshed straw to be put to uses to which it would otherwise be unavailable, as, for example, the stuffing of horse-collars, for which it is desirable to have straight straws. This construction of cylinder and concave results in economy also from the fact that it is not necessary to rebind the straw after threshing. After the sheaves have passed between the cylinder and concave and the grain threshed out, the sheaves and grain are disposed of by other means in the machine not forming part of this invention.

Having thus described my invention, what I claim as new, and desire to secure by Letters Patent, is—

1. A threshing-machine cylinder that is uniform in size in one portion and gradually tapers from that portion toward one end, the larger portion thereof having grain-rubbing elements thereon and a part of the tapered portion being smooth and devoid of projections.

2. In a threshing-machine, the combination of side-frame members, a cylinder journaled therein, supporting projections on the inside of said frame members, a trough-like segmental member resting on the projections on one side and abutting the side of the frame, cross bars extending into said trough-like member and operating to hold the latter against the side of the frame and in supported relation to said projections, means associated with the projections on the other side of the machine whereby said bars are supported at the other ends, and a concave plate on said bars.

3. In a threshing-machine, the combination of side frame members, a cylinder journaled therein, a concave in coöperative relation to said cylinder, a plurality of bars on which said concave rests, means for supporting the bars on one of said side frame members, splice members secured to some of said bars, a strap secured to the ends of said bars opposite to said supporting means, and means whereby said splice members are supported at their free ends.

4. In a threshing-machine, the combination of side frame members, a cylinder journaled therein, a concave in coöperative relation to said cylinder, a plurality of bars on which said concave rests, means for supporting the bars on one of said side frame members, splice members secured to said bars, a strap connecting said bars and disposed between them and said splice members, and means whereby said splice members are supported at their free ends.

In testimony whereof I affix my signature in presence of two witnesses.

GUY REYNOLDS SHULTZ.

Witnesses:
MYRA BOYD,
ORD CLINGMAN.